US00RE36050E

United States Patent [19]

Thakur et al.

[11] E Patent Number: Re. 36,050

[45] Reissued Date of Patent: Jan. 19, 1999

[54] METHOD FOR REPEATABLE TEMPERATURE MEASUREMENT USING SURFACE REFLECTIVITY

[75] Inventors: Randhir P. S. Thakur; Gurtej S. Sandhu; Annette L. Martin, all of Boise, Id.

[73] Assignee: Micron Technology, Inc., Boise, Id.

[21] Appl. No.: 722,360

[22] Filed: Sep. 27, 1996

Related U.S. Patent Documents

Reissue of:

[64] Patent No.: 5,350,236
Issued: Sep. 27, 1994
Appl. No.: 28,051
Filed: Mar. 8, 1993

[51] Int. Cl.[6] ..... G01J 5/54

[52] U.S. Cl. ..... 374/161; 374/129; 356/43

[58] Field of Search ..... 374/120, 121, 374/123, 128, 129, 161; 356/43, 445, 448; 250/341

[56] References Cited

U.S. PATENT DOCUMENTS

| | | | |
|---|---|---|---|
| 3,672,221 | 6/1972 | Weil | 374/161 |
| 4,136,566 | 1/1979 | Christensen | 374/161 |
| 4,583,861 | 4/1986 | Yamaji et al. | 356/448 X |
| 4,956,538 | 9/1990 | Moslehi | 374/161 X |
| 5,102,231 | 4/1992 | Loewenstein et al. | 374/129 |
| 5,208,643 | 5/1993 | Fair | 374/161 X |
| 5,213,985 | 5/1993 | Sandroff et al. | 374/161 X |

OTHER PUBLICATIONS

F.Y. Sorrell et al. Applied RTP Optical Modeling: An Argument for Open Loop Control, SRC Contract 91–MP–132 SRC PUB C92470, Aug. 1992, pp. 1–8.

Tsutomu Sato, Spectral Emissivity of Silicon, Japanese Journal of Applied Physics vol. 6, No. 3, Mar. 1967 pp. 339–347.

JM Dihac et al. . . . In Situ Wafer Emmissivity Measurement in a Rapid Thermal Processor, Mat Res. Soc Symp. Proc vol. 224 Materials Research Society, 1991 pp. 3–8.

W. A. Barron, The Principals of Infrared Thermometry, Sensors Dec. 1992, pp. 10–19.

F. Yates Sorrell et al. . . . Temperature Uniformity in RTP Furnaces, IEEE Transactions on Electron Devices vol. 39 No. 1, Jan. 1992, pp. 75–79.

*Primary Examiner*—G. Bradley Bennett
*Attorney, Agent, or Firm*—Trask, Britt & Rossa

[57] ABSTRACT

A method is disclosed for continuously measuring the temperature of a semiconductor substrate in a chamber is disclosed. The first step of the method involves providing a substantially clean semiconductor substrate having a layer a reflective surface thereon into a chamber. A film is formed superjacent the surface by introducing a gas comprising at least one of $N_2$, $NH_3$, $O_2$, $N_2O$, Ar, Ar—$H_2$, $H_2$, $GeH_4$, or any fluorine based gas and photon energy in situ. The photon energy, having a wavelength substantially in the absorption band of silicon, generates a temperature substantially within the range of 500° C. to 1250° C. Subsequently, the reflectivity of the surface is measured prior to introducing the gas, and continuously, while forming the film until the film is substantially formed. The substrate is exposed to photon energy having a power level responsive to the measured reflectivities of the film.

62 Claims, 7 Drawing Sheets

(KNOWN ART)

(KNOWN ART)

METHOD FOR REPEATABLE TEMPERATURE MEASUREMENT USING SURFACE REFLECTIVITY

Matter enclosed in heavy brackets [ ] appears in the original patent but forms no part of this reissue specification; matter printed in italics indicates the additions made by reissue.

CROSS REFERENCE TO RELATED APPLICATIONS

This application is related copending application of Ser. No. 08/028040, filed on Mar. 5, 1993.

FIELD OF THE INVENTION

This invention relates to a method for measuring the temperature of a semiconductor wafer.

BACKGROUND OF THE INVENTION

In the fabrication of semiconductor wafers one recurring problem has been temperature measurement and control. When processing a semiconductor substrate, the temperature of the to side of the substrate being processed is of critical importance. Overheating can cause dopants to permeate subjacent layers, and under-heating can produces layers which are unreliable and subject to lower tolerances. In this light, several solutions have been put forth to gauge the substrate's temperature to avoid overheating and underheating, and thus provide a uniform ramp up, steady state and/or ramp down cycle.

Referring to FIG. 1, a pyrometric system for measuring the temperature of a semiconductor substrate in a chamber known in the art is illustrated In this system, a lamp 100 is employed to heat substrate 110. Substrate 110 is situated within chamber 120, and the substrate's top side 115 is positioned in association with lamp 100 accordingly. To maintain the stability of substrate 100, a series of supports, 130 and 130', emanate from the bottom of chamber 120. A sensor (not shown) is positioned between supports 130 and 130' and in association with the underside 116 to sense the temperature of the underside 116 of substrate 110.

The pyrometric system depicted in FIG. 1 is inadequate for precise temperature measurements. By measuring the underside of the substrate, this approach yields only an approximate measurement of the top side at best. Moreover, the underside is not traditionally processed, and as such, measurements with regards to that portion of the wafer are superfluous.

Referring to FIG. 2, a system configuration for measuring the temperature of a semiconductor substrate in a chamber known in the art is illustrated. In this system, a substrate 210, positioned within a chamber 220, is positioned in association with lamp 200 for heating purposes. Instead of the approach of FIG. 1, here a sensor 230, positioned on the side of substrate 210, is employed to detect the thermal expansion of substrate 210, which is directly translatable to the substrate's temperature However, the system depicted in FIG. 2 also has several shortcomings. Firstly, though a relationship exists between thermal expansion and temperature, an accurate temperature measurement is formidable to obtain because of the difficulties in fabricating sufficiently sensitive sensors to detect expansion. Second, several layers are formed superjacent the substrate, with each layer having a different thermal coefficient As such, most measurements of the thermal expansion of the substrate are inaccurate. Third, in actual semiconductor manufacturing, substrate's are exposed to several thermal steps. Thus, actual measurements of expansion are transitory.

SUMMARY OF THE INVENTION

In light of the limitations of the known approaches to measuring the temperature of the side of a substrate to be processed, several alternatives have been examined. One such alternative explores optical pyrometry as means for accurately measuring the temperature of a substrate. The basis for this approach is the relationship between the surface reflectivity, surface emissivity, and surface temperature. Fundamentally, the relationship between emissivity and a substrate optical properties can be expressed, in light of Kirchoff's law, by the following:

$$\epsilon(\lambda,T)=1-R(\lambda,T)-\tau(\lambda,T),$$

where $\epsilon$=spectral emissivity

R=reflectivity, $\tau$=transmissivity, $\lambda$=wavelength, and

T=temperature

As such, the emissivity of a plane parallel specimen for normal incidence has been expressed by the following mathematical formula:

$$\epsilon=[(1-R)(1-\tau)]/[(1-R^*],$$

where R, the true reflectivity, is given by the following equation:

$$R=[(n-1)^2+k^2]/[(n+1)^2+k^2],$$

while $\tau$, the true transmissivity, is given by the following formula:

$$\tau=\exp(-Kt)=\exp(-4\pi kt/\lambda),$$

where n=refractive index, k=extinction coefficient,

K=absorption coefficient, $\lambda$=wavelength, and t=thickness of the specimen

Given these mathematical expressions, under quasi-steady state conditions the heat, generated from a lamp, and absorbed by the substrate is equal to the emission from the wafer, an additional formula can be derived representing the relationship between temperature and emissivity:

$$Q^*\epsilon_A=\epsilon_E^*\sigma^*T^4$$

where

Q=heat flux from the lamp presumably constant over the substrate $\epsilon_A$=absorptivity of the substrate $\epsilon_E$=emissivity of the substrate $\sigma$=Stephan-Boltzman constant, and T=temperature of the wafer.

In light of the above, the primary object of the present invention is to eliminate the aforementioned drawbacks of the prior art.

It is a further object of the present invention to provide a system and method for accurately measuring the temperature surface of the top side of a substrate being processed.

Another object of the present invention is to provide a system and method for effectively controlling the temperature surface of a substrate being processed.

Still another object of the present invention is to provide a system and method for accurately measuring the temperature of a substrate regardless of the number of layers formed superjacent the substrate.

Yet another object of the present invention is to provide a system and method for accurately measuring the temperature of a substrate independent of the number of thermal steps applied to the substrate.

A further object of the present invention is to provide a system and method for accurately measuring the temperature of a substrate which is particularly useful in where the substrate's surface characteristics are constantly changing.

In order to achieve the hereinabove objects, as well as others which will become apparent hereafter, a method for externally measuring the continuous temperature of a semiconductor substrate in chamber is disclosed. The fist step of the method involves providing a substantially clean semiconductor substrate having a layer a reflective surface superjacent into a chamber. Once provided, a film is formed superjacent the surface by introducing a gas comprising at least one of $N_2$, $NH_3$, $O_2$, $N_2O$, Ar, Ar—$H_2$, $H_2$, $GeH_4$, or any Fluorine based gas, and photon energy in situ. The photon energy, having a wavelength substantially in the absorption band of silicon, generates a temperature substantially within the range of 500° C. to 1250° C. Subsequently, the reflectivity of the surface is measured prior to introducing the gas and continuously while forming the film until the film is substantially formed. The substrate is exposed to the photon energy, the energy having a power level responsive to the measured reflectivities of the film.

Moreover, in order to achieve additional objects, a system for externally measuring the temperature of a substrate having a reflective surface within a chamber is disclosed. The system comprises a first light source having sufficient intensity for bombarding the reflective surface with photons, thereby heating the surface. The first light source has an output level and a wavelength substantially in the absorption band of silicon. The wavelength ranges from substantially low ultraviolet to substantially high infrared, or 0.2 μm to 2.2 μm. The system also comprises means for exposing the substrate to a gas in order to form a layer superjacent the reflective surface. Moreover, a sensor, preferably a photo detector, for sensing changes in the reflectivity of the surface caused by the first light source and the exposing means are included. In one embodiment of the present invention, the sensor comprises a second light source, having an initial transmissivity and a wavelength range substantially spaced from the first light source, for reflecting photons off the surface and a sensor, preferably a photo detector, for sensing the reflectivity of the surface caused by the reflecting photons. The sensor can also comprise a spectrophotometer or light sensor. Furthermore, the system comprises control circuitry for controlling the first light source in response to the sensor; the control circuitry being coupled to the sensor by a feedback loop. The feedback loop comprises a differentiating amplifier for differentiating between the initial transmissivity and the changes in the reflectivity, thereby generating a signal. In response to the signal, the control system controls the first light source's output level.

Other objects and advantages will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
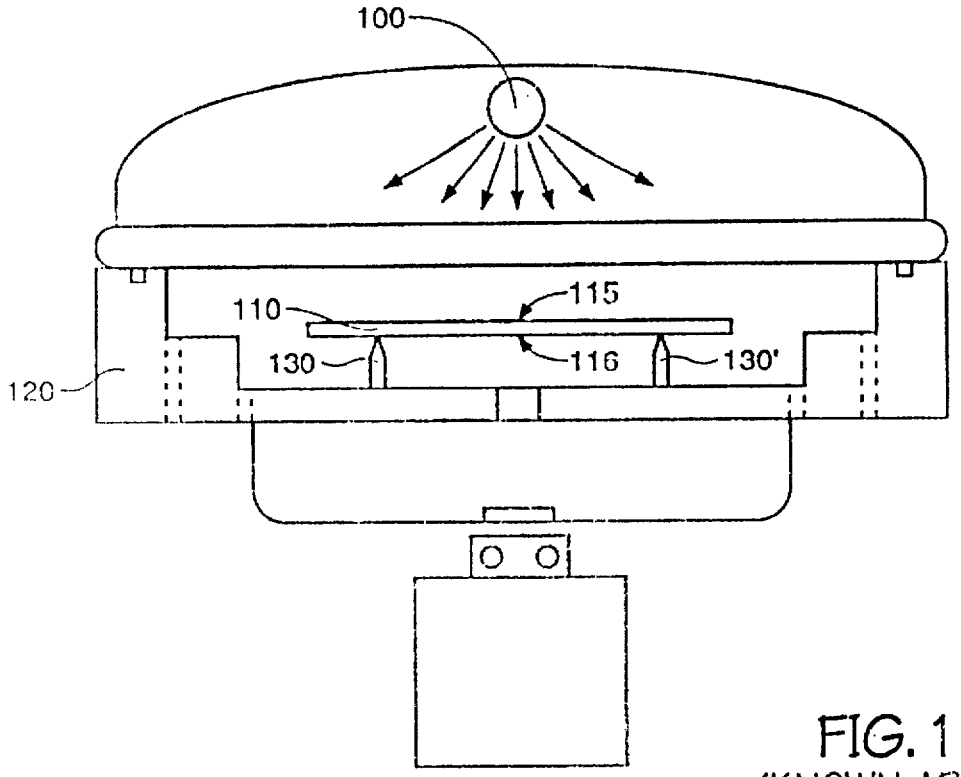
FIG. 1 is a system for measuring the temperature of a semiconductor substrate in a chamber known in the art.
Figure 2:
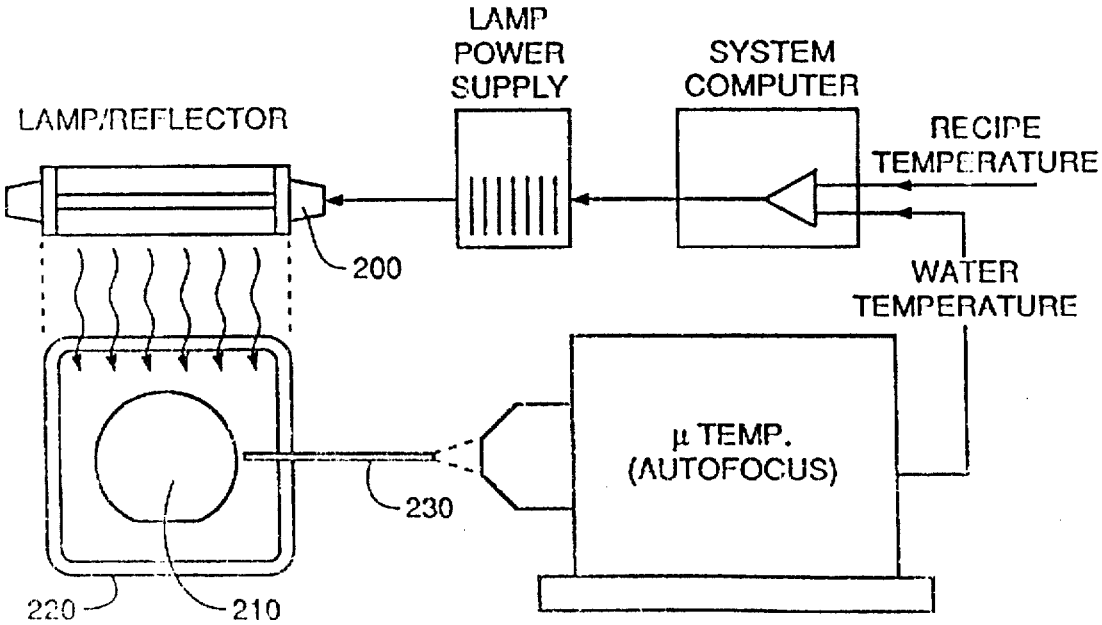
FIG. 2 is a system for measuring the temperature of a semiconductor substrate in a chamber known in the art.
Figure 3:
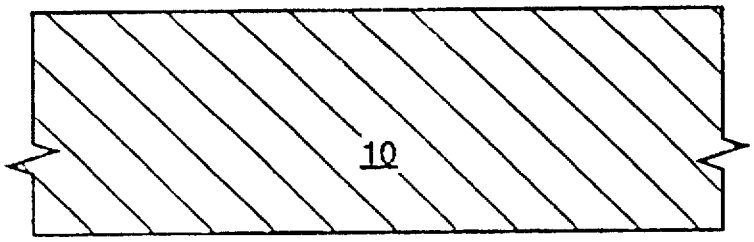
FIG. 3 is a cross-sectional view of a semiconductor substrate prior to undergoing the steps of the present invention.

Referring to FIG. 3, a semiconductor substrate 10 is illustrated prior to undergoing the present inventive method. Semiconductor substrate 10, comprising single-crystal silicon, polycrystalline silicon, amorphous silicon, or any other semiconductive, conductive or insulative substrate—such as Indium Phosphide or Gallium Arsenide for example—is first provided into a chamber, such as a Rapid Thermal Processing ("RTP") chamber or a Chemical Vapor Deposition ("CVD") chamber. Further, substrate 10 can be rugged and/or smooth.

In the preferred embodiment, substrate 10 has been atomically cleaned prior to undergoing the present inventive method. A native silicon dioxide layer (not shown) can easily form superjacent substrate 10 by simple exposure to the atmosphere. Unfortunately, native silicon dioxide has inferior electrical and structural characteristics when compared with other dielectric type materials, such as grown silicon dioxide. As such, the overall electrical and structural characteristics of the completed wafer having native silicon dioxide are substantially impacted. Thus, in order to maintain the wafer's integrity, any native silicon dioxide formed should be removed by atomically cleaning substrate 10.

There are a variety of techniques for removing native oxide. Those known to one of ordinary skill in the art are not described. In the preferred embodiment of the present inventive method, native silicon dioxide is removed by introducing a relative gas as $CF_4$, $C_2F_2$, $C_2F_6$, $C_4F_8$, $CHF_3$, HF, $NF_3$, $NF_3$ dilute with Ar—$H_2$, $GeHF_4$, or $H_2$ diluted with Ar—$H_2$, at a temperature substantially within the range of 500° C. to 1250° C. for appropriatly 10 to 60 seconds. Relying on this approach, any native silicon dioxide formation between 10Å and 20Å can be easily removed.

Figure 4:
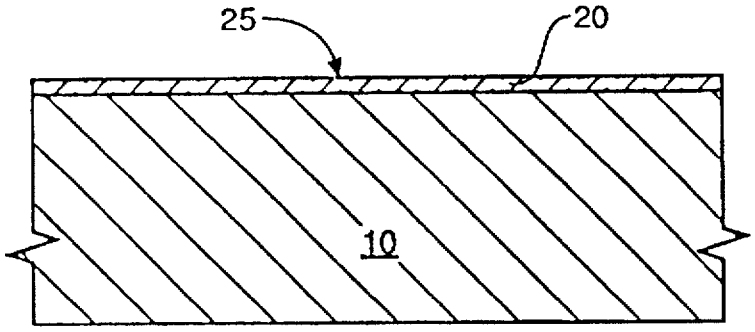
FIG. 4 is a cross-sectional view of undergoing the first step of the present inventive method.

Referring to FIG. 4, a first embodiment of the present inventive method is depicted, illustrating a layer 20 positioned superjacent clean substrate 10. Layer 20 comprises a reflective surface 25. Surface 25 is preferably uniformly reflective. Alternately, in a second embodiment, substrate 10 itself comprises a, preferably uniformly, reflective surface (not shown). In a further embodiment of the present inventive method, layer 20 comprises a mask pattern formed as a result of masking step or steps of layer 20 after layer 20 is positioned superjacent substrate 10.

Layer 20 can be formed superjacent substrate 10, preferably in situ under substantially high vacuum, through a variety of approaches known in the art, including Chemical Vapor Deposition ("CVD"), Rapid Thermal Processing Chemical Vapor Deposition ("RTPCVD"), Low Pressure Chemical Vapor Deposition ("LPCVD"), Molecular Beam Epitaxy ("MBE"), Reactive Ion Sputtering ("RIS"), Physical Vapor Deposition ("PVD") and Plasma Processing. It should be obvious to one of ordinary skill in the art that other methods can also be employed in the herein inventive method for forming layer 20 superjacent substrate 10.

Layer 20 can comprise a variety of characteristics in addition to its reflectivity. For example layer 20 can comprise conductive, semiconductive, or insulative properties. In that light, in the event that layer 20 functions as a barrier type layer, TiN or TaN are preferable compounds. Nonetheless, one of ordinary skill in the art can select another compound having similar qualities for functioning as a barrier layer.

Figure 5:
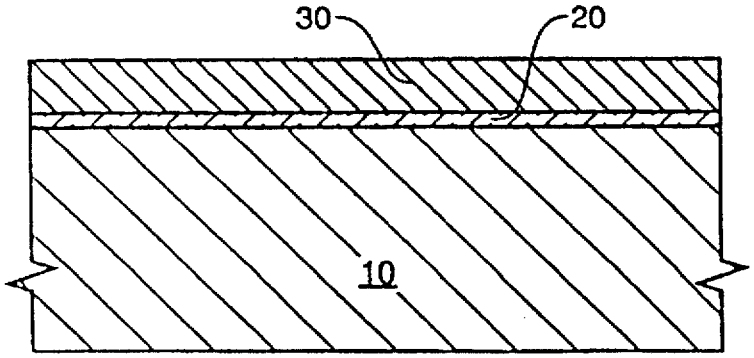
FIG. 5 is a cross-sectional view of undergoing the second step of the present inventive method.

Referring to FIG. 5, a film 30 is shown superjacent surface 25. Subsequent to forming layer 20 having reflective layer 25 superjacent substrate 20 in the first embodiment, or solely providing a substrate having a reflective sure in the second embodiment (not shown) film 30 is formed by exposing substrate 20 to a reactive gas and radiant energy, preferably in situ under substantially high vacuum. Film 30 can comprise conductive, semiconductive, or insulative properties. The gas can be selected from a diverse number of reactive compounds, such as $N_2$, $NH_3$, $O_2$, $N_2$, Ar, Ar—$H_2$, $H_2$, $GeHF_4$, or any Fluorine based gas. Substrate 10 is exposed to the gas for approximately 5 seconds to 60 seconds at a flow rate substantially in the range of 50 sccm to 20,000 sccm. Further, radiant energy is introduced into the chamber in order to generate heat substantially within the range of 500° C. to 1250° C.

It is important to note first, that the introduction of radiant energy can begin at any time prior to the formation of film 30. Nevertheless, the energy must be present during the formation of film 30. Secondly, the flow rate, temperature, and length of exposure are variables dependent on each other. As such, it should be obvious to one of ordinary skill in the art that an exact flow rate is dependent on the length of exposure, the temperature, etc.

The radiant energy employed in the present invention consists of photon energy having a wavelength substantially in the absorption band of the substrate. Further, the energy comprises a wavelength range from substantially low ultraviolet to substantially high infrared, or 0.2 μm to 2.2 μm. Moreover, a light source, such as a Halogen, Ultra Violet, Infrared lamp, or discharge lamp is preferably used to generate the radiant energy.

To achieve a more uniform film by more uniformly heating the substrate, unlike the known art, the reflectivity of surface 25 is measured while the gas and radiant energy are being introduced. As reflectivity is directly proportional to intensity and temperature, the temperature of the substrate 10 can be easily obtained, once a system capable of employing the herein inventive method is properly calibrated. Thus, by comparing the reflectivity of the surface prior to exposing it to gas and radiant energy and during the step of forming the film 30, changes in the surface 25 temperature can be calculated. Having this formation the intensity or power associated with the radiant energy can be properly compensated, in light of the changing surface characteristics, in order to maintain steady heating. As such, during the step of introducing the gas and radiant energy, the surface reflectivity is monitored. This step in comparing the reflectivities is preferably continuous until film 30 is substantially formed to allow for uniform heating in its formation.

Figure 6:
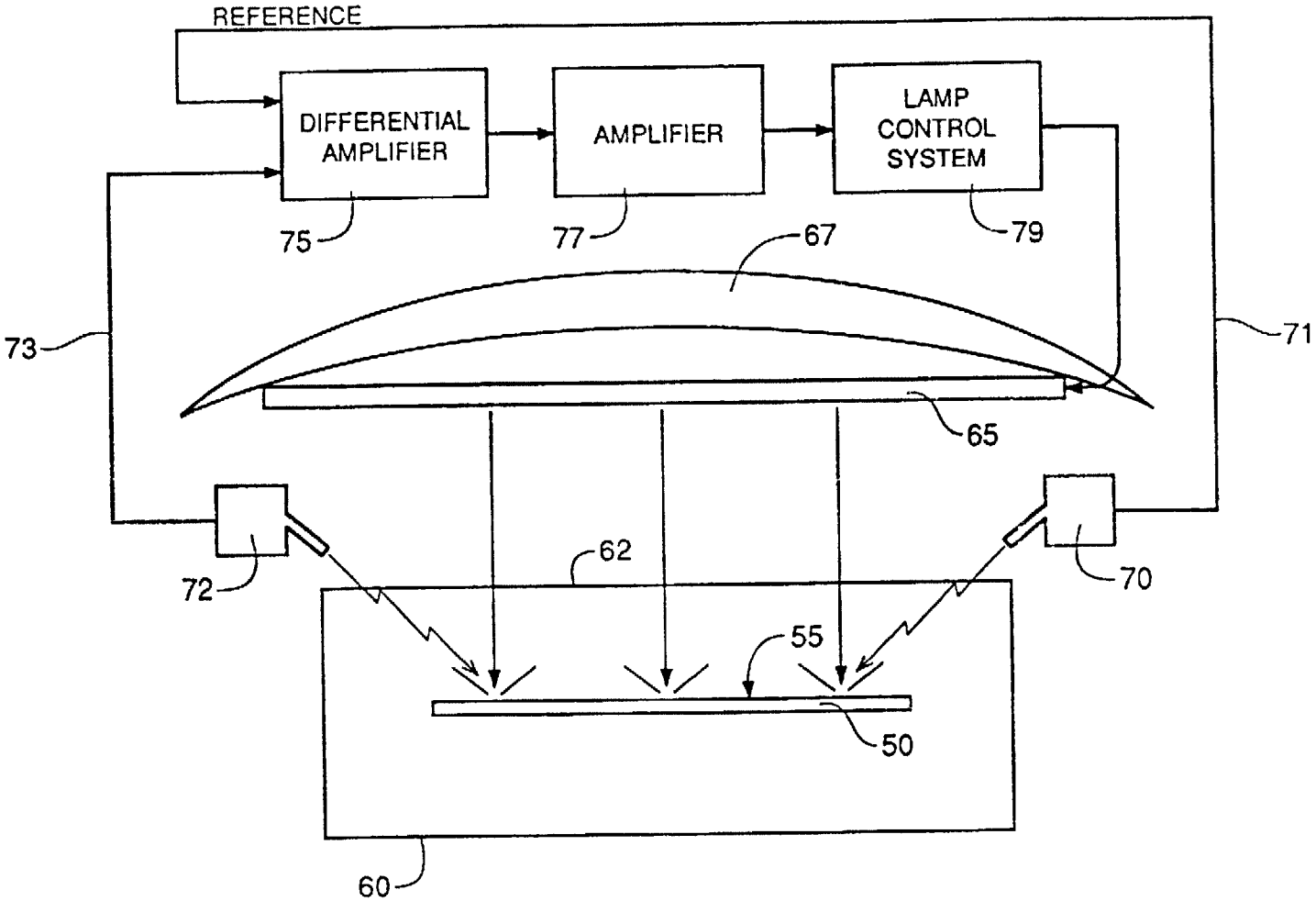
FIG. 6 is the preferred embodiment of present inventive system configuration.

In order to achieve the benefits of the hereinabove inventive method, an inventive system can be configured for repeatably measuring the temperature of a substrate based on the surface reflectivity of the substrate. Referring to FIG. 6, the preferred embodiment of such a system is illustrated. Provided with a chamber 60, is a substrate 50 having a top reflective surface 55. To enable photon energy to pass through chamber 60 and onto surface 55, chamber 60 comprises a transparent window 62. Window 62 can comprise any transparent material with minimum absorption of incident photons, such as quartz, enabling energy in substantially low ultraviolet to substantially high infrared range to pass through. Window 62 should also preferably promote minimum transfer of photon energy by use of appropriate materials, such as calcium fluoride for example.

In cooperation with surface 55 and window 62 is a light source 65. Light source 65 is employed for the purpose of bombarding reflective surface 55 with photon energy to thereby heat surface 55. As such, source 65 requires a wavelength substantially in the option band of silicon. The wavelength of light source 65 has a range substantially between substantially low ultraviolet to substantially high infrared, or 0.2 μm to 2.2 μm. To maximize the output of light source 65, a reflector 67 is positioned in association with light source 65. Reflector 67 comprises a highly reflective material coating, such as gold film.

In the preferred embodiment of the present inventive system, light source 65 comprises a lamp array. In such a scheme, a Halogen Ultra Violet, or Infrared filament lamp is preferable. In an alternate embodiment, however, light source 65 comprises a single lamp, such as either an arc discharge lamp or Xe discharge lamp.

Moreover, chamber 60 comprises means for exposing (not shown) substrate 50 to a reactive gas within the chamber. This means includes all the necessary equipment known by one of ordinary skill in the art to introduce a gas into a chamber, such as a gas reserve tank and means for controlling the flow rate of the gas for example. By introducing substrate 50 to a reactive gas and radiant energy, a layer (not shown) can be formed superjacent substrate 50. The reactive gas can be selected from a diverse number of reactive compounds, such as $N_2$, $NH_3$, $O_2$, $N_2O$, Ar, Ar—$H_2$, $H_2$, $GeH_4$, or any Fluorine based gas. Substrate 50 is exposed to the gas for approximately 5 seconds to 60 seconds at a flow rate substantially in the range of 50 sccm to 20,000 sccm, and the heat required to be generated the radiant energy is substantially within the range of 500° C. to 1250° C.

In the preferred embodiment of the present inventive system, a pair of light sensory 70 and 72, are employed for sensing the temperature of the top reflective surface 55. Light sensors 70 and 72 comprise at last one of a spectrophotometer and photo detector. As light source 65 bombards substrate 50 with energy, some photons are reflected off surface 55. In light of the relationship between the reflectivity/emissivity of a surface and its temperature, changes in the temperature of top reflective surface 55 caused by exposing substrate 50 to the reactive gas and photon energy are detectable by light sensors 70 and 72. Light sensor 70 initially measures the reflectivity of surface 55 at the onset of the introduction of photon energy yet prior to exposure to reactive gas. The output of sensor 70 is a reference signal 71. In contrast, light sensor 72 continuously senses the reflectivity of surface 55 while substrate 50 is exposed to both photon energy and reactive gas until the layer is substantially formed superjacent substrate 50. The output of sensor 72 results in a sensing signal 73.

As a result of securing reference signal 71 and sensing signal 73, changes in the reflectivity of surface 55, and thus, changes in the temperature of surface 55 can be calculated. By doing so, the temperature of substrate and surface 55 can be controlled to provide uniform ramp up, steady state or ramp down cycle. To achieve this control feature, both reference signal 71 and sensing signal 73 are first fed to a differential amplifier 75. Differential amplifier 75 differentiates between both signals, providing an output differential signal comprising information relating to changes in reflectivity of surface 55. Differential signal is then fed into an amplifier stage 77, which amplifies the differential signal. This amplified differential signal is then fed to a lamp control system 79. Lamp control system 79, having the amplified differential signal as an input systematically controls of the output level of light source 65. This can be accomplished in a variety of ways known to one of ordinary skill in the art, such as a microcomputer for example. By employing this feedback control scheme, such as Proportional Integral Derivative ("PID") for example, the output level of light source 65 can be calibrated so as to provide a more uniform ramp up, steady state or ramp down cycle.

Figure 7:
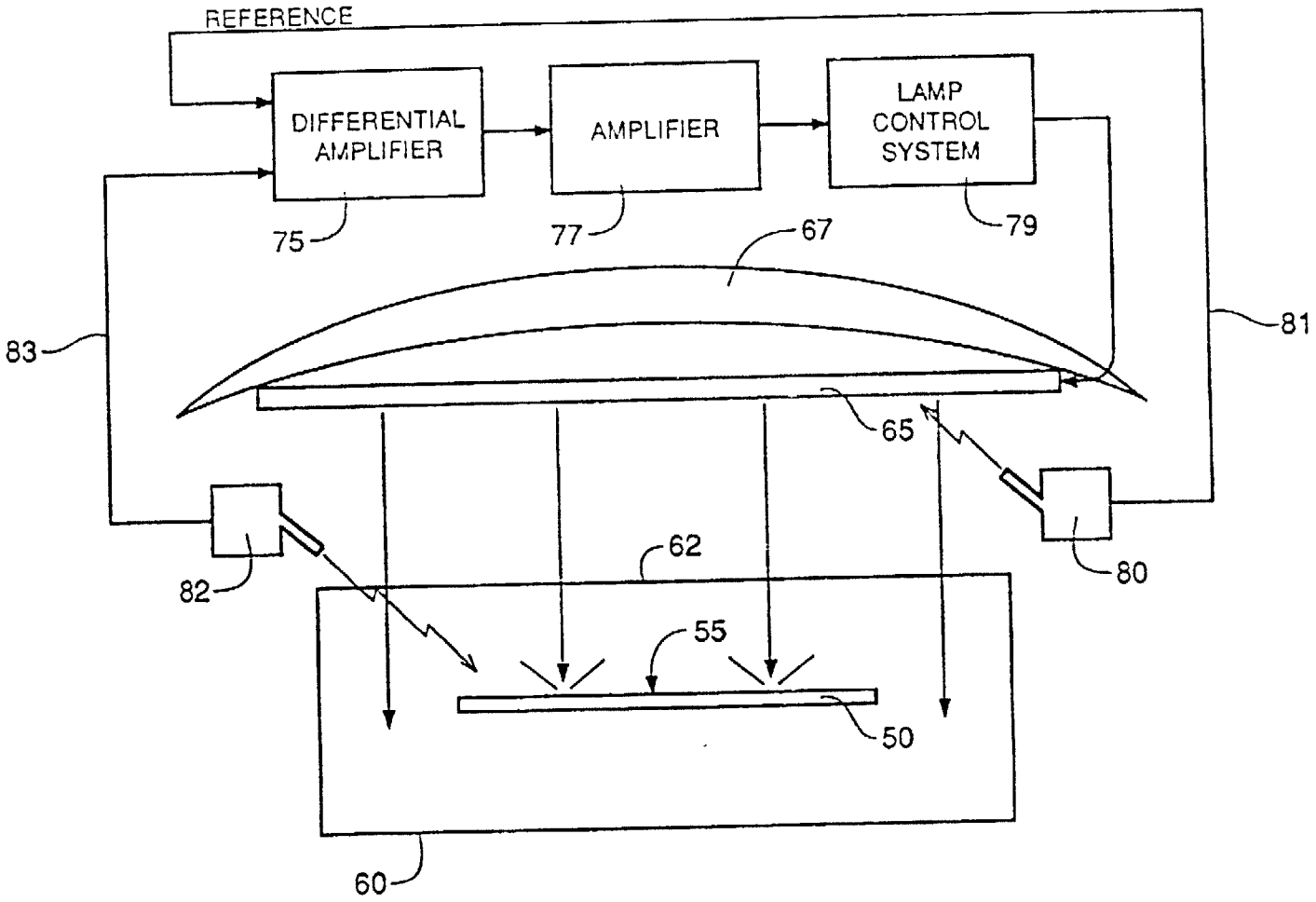
FIG. 7 is a first alternate embodiment of present inventive system configuration.

Referring to FIG. 7, a first alternate embodiment of the present inventive system is provided. As before, substrate 50, with its reflective surface 55, is positioned within chamber 60, in association with transparent window 62. Nevertheless, in this embodiment, in place of measuring the initial reflectivity of surface, a light sensor 80 is employed to sense the initial transmissivity of light source 65. Given the direct relationship between transmissivity, reflectivity and temperature, light sensor 80 generates a reference signal 81. Likewise, light sensor 82 continuously senses the reflectivity of surface 55 while substrate 50 is exposed to both photon energy and reactive gas until the layer is substantially formed superjacent substrate 50. Light sensors 80 and 82 comprise at least one of a spectrophotometer and photo detector. The output of sensor 82 results in a sensing signal 83.

As a result of securing reference signal 81 and sensing signal 83, changes in the reflectivity of surface 55, and thus, changes in the temperature of surface 55 can be calculated. By doing so, the temperature of substrate 50 and surface 55 can be controlled to provide uniform ramp up, steady state or ramp down cycle. To achieve this control feature, both reference signal 81 and sensing signal 83 are first fed to a differential amplifier 75. Differential amplifier 75 differentiates between both signals, providing an output differential signal comprising information relating to changes in reflectivity of surface 55. Differential signal is then fed into an amplifier stage 77, which amplifies the differential signal. This amplified differential signal is then fed to a lamp control system 79. Lamp control system 79, having the amplified differential signal as an input, systematically controls the output level of light source 65. This can be accomplished a variety of ways known to one of ordinary skill in the art, such as a microcomputer for example. By employing this feedback control scheme, such as PID for example, the output level of light source 65 can be calibrated so as to provide a more uniform ramp up, steady state or ramp down cycle.

Figure 8:
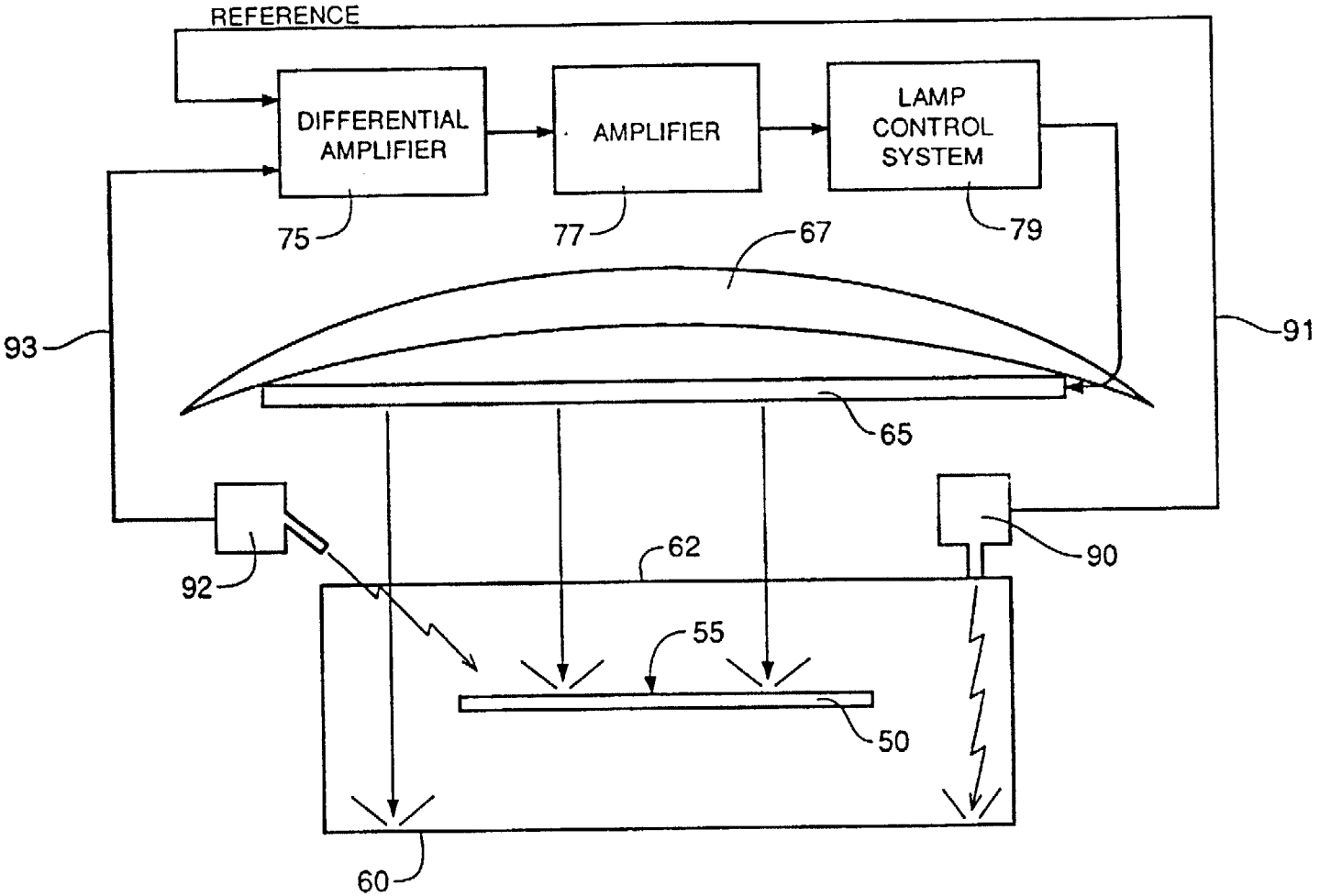
FIG. 8 is a second alternate embodiment of present inventive system configuration.

Referring to FIG. 8, a second alternate embodiment of the present inventive system is provided. As before, substrate 50, with its reflective surface 55, is positioned within chamber 60, in association with transparent window 62. Nonetheless, in this embodiment, the changing reflectivity of chamber 60 and its interior is accounted in the control of light source 65. As the reflectivity of the interior of chamber 60 directly effects the temperature of substrate 50, a light sensor 90 is positioned in association with window 62. As such, sensor 90 senses the initial reflectivity of the interior of chamber 60, generating a reference signal 91. Likewise, light sensor 92 continuously senses the reflectivity of surface 55 while substrate 50 is exposed to both photon energy and reactive gas until the layer is substantially formed superjacent substrate 50. Light sensors 90 and 92 comprise at least one of a spectrophotometer and photo detector. The output of sensor 92 results is a sensing signal 93.

As a result of securing reference signal 91 and sensing signal 93, changes in the reflectivity of surface 55, and thus, changes in the temperature of surface 55 can be calculated. By doing so, the temperature of substrate 50 and surface 55 can be controlled to provide uniform ramp up, steady state or ramp down cycle. To achieve this control feature, both reference signal 91 and sensing signal 93 are first fed to a differential amplifier 75. Differential amplifier 75 differentiates between both signals providing an output differential signal comprising information relating to changes in reflectivity of surface 55. Differential signal is then fed into an amplifier stage 77, which amplifies the differential signal. This amplified differential signal is then fed to a lamp control system 79. Lamp control system 79, having the amplified differential signal as an input, systematically controls the output level of light source 65. This can be accomplished by a variety of ways known to one of to ordinary skill in the art, such as a microcomputer for example. By employing this feedback control scheme, such as PID for example, the output level of light source 65 can be calibrated so as to provide a more uniform ramp up, steady state or ramp down cycle.

Figure 9:
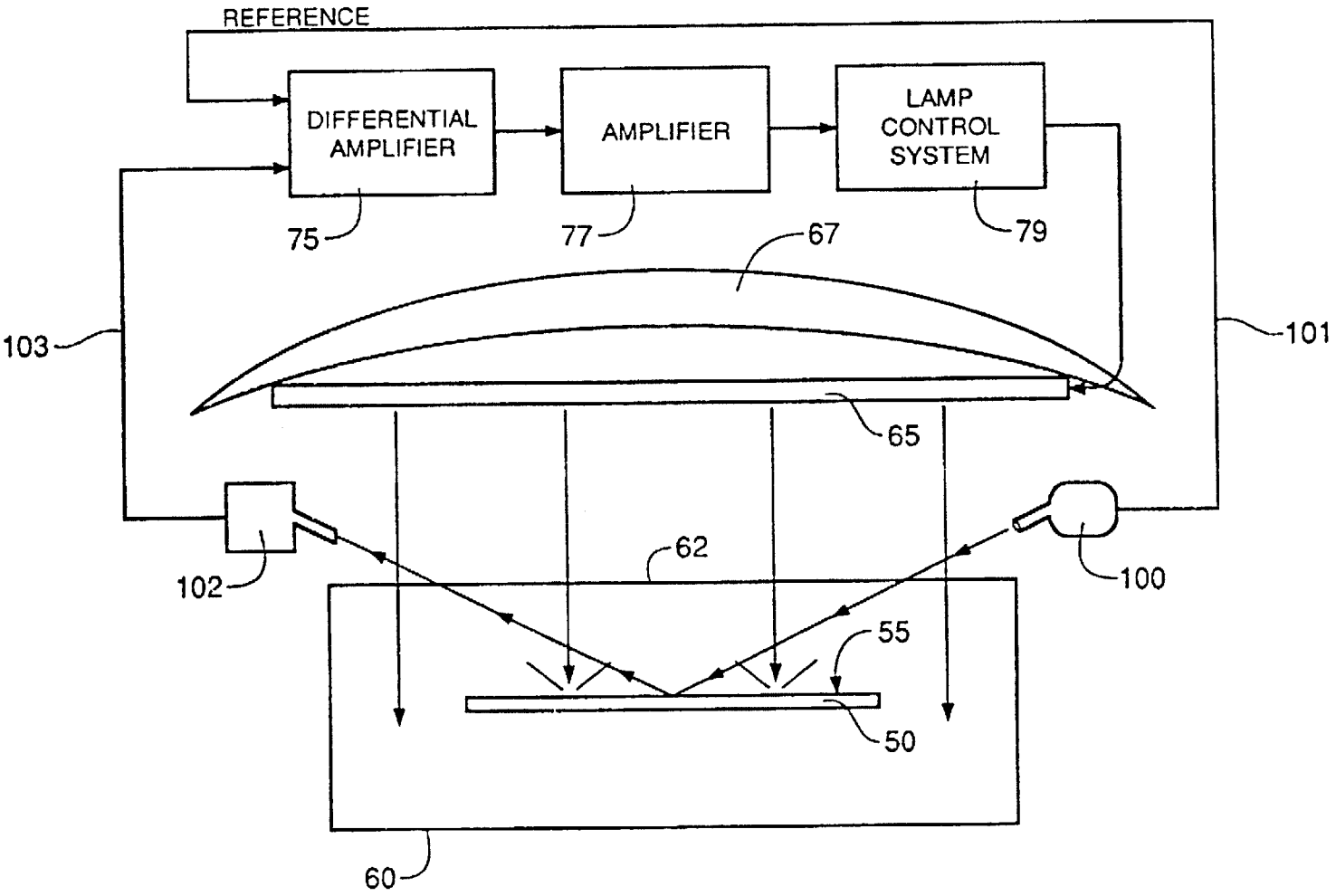
FIG. 9 is a third alternate embodiment of present inventive system configuration.

Referring to FIG. 9, a third alternate embodiment of the present inventive system is provided. As before, substrate 50, with its reflective surface 55, is positioned within chamber 60, in association with transparent window 62. However, in this embodiment, a second light source 100, preferably a laser, such as a $CO_2$ laser, He—Ne laser, or semiconductor diode, is employed in association with transparent window 62 for ascertaining the reflectivity of surface 55. Second light source 100 comprises an initial transmissivity. Given the direct relationship between transmissivity, reflectivity and temperature second light source 100 generates a reference signal 101 from its level transmissivity. In cooperation with second light source 100, a light sensor 102 is employed in association with transparent window 62 for continuously sensing the reflectivity of surface 55 while substrate 50 is exposed to both photon energy and reactive gas until the layer is substantially formed superjacent substrate 50. Sensor 102 senses the reflection of those photons emanating from second light some 102 through window 62. Sensor 102 comprises at last one of a spectrophotometer and photo detector. To avoid potential for interference caused by first light source 65 in sensing second light source 100, first light source 65 has a wavelength source 100. Further, sensor 102 can be tuned, accordingly, to sense photon energy within a certain wavelength range. The output of sensor 102 results in a sensing signal 103.

As a result of securing reference signal 101 and sensing signal 103, changes in the reflectivity of surface 55, and thus, changes in the temperature of surface 55 can be calculated. By doing so, the temperature of substrate 50 and surface 55 can be controlled to provide uniform ramp up, steady state or ramp down cycle. To achieve this control feature, both reference signal 101 and sensing signal 103 are first fed to a differential amplifier 75. Differential amplifier 75 differentiates between both signals, providing an output differential signal comprising information relating to changes in reflectivity of surface 55. Differential signal is then fed into an amplifier stage 77, which amplifies the differential signal. This amplified differential signal is then fed to a lamp control system 79. Lamp control system 79, having the amplified differential signal as an input, systematically controls of the output level of light source 65. This can be accomplished a variety of ways known to one of ordinary skill in the art, such as a microcomputer for example. By employing this feeds control scheme, such as PID for example, the output level of light source 65 can be calibrated so as to provide a more uniform ramp up, steady state or ramp down cycle Referring to FIG. 10, a fourth alternate embodiment of the present inventive system is provided. As before, substrate 50, with its reflective surface 55, is positioned within chamber 60, in association with transparent window 62. However, in this embodiment, first light source 65 comprises two lamp arrays 64 and 66. Each lamp array comprises a series of individual lamps—64(a)–64(e) and 66(a)–66(e)—preferably comprised of a Halogen, Ultra Violet, or Infrared filament. Functionally, lamp array 64 bombards top reflective surface 55 with photon energy, while, in contrast, lamp array 66 bombards the bottom surface 56 of substrate 50. Though the layer forms superjacent surface 55, the heat generated by bombarding the bottom surface 56 of substrate 50 through lamp array 66 expedites the overall time in processing substrate 50.

Furthermore, like the previous embodiment second light source 100, preferably a laser, such as a $CO_2$ laser, He—Ne laser, or semiconductor diode, is employed for ascertaining the reflectivity of surface 55. Second light source 100 comprises an initial transmissivity. Given the direct relationship between transmissivity, reflectivity and temperature, second light source 100 generates reference signal 101 from its level transmissivity. In cooperation with second light source 100, light sensor 102 is employed for continuously sensing the reflectivity of surface 55 while substrate 50 is exposed to both photon energy and reactive gas until the layer is substantially formed superjacent substrate 50. Sensor 102 senses the reflection of those photons emanating from second light source 102. Sensor 102 comprises at least one of a spectrophotometer and photo detector. To avoid potential for interference caused by first light source 65 in sensing second light source 100, first light source 65 has a wavelength substantially spaced from the wavelength of second light source 100. The intensity of second light source 100 is moreover substantially low such that the neither surface 55 nor the layer being formed will be caused react. Further, sensor 102 can also be tuned, accordingly, to sense photon energy within a certain wavelength range. The output of sensor 102 results in sensing signal 103.

As a result of securing reference signal 101 and sensing signal 103, changes in the reflectivity of surface 55, and thus, changes in the temperature of surface 55 can be calculated. By doing so, the temperature of substrate 50 and surface 55 can be controlled to provide uniform ramp up, steady state or ramp down cycle. To achieve this control feature, both reference signal 101 and sensing signal 103 are first fed to a differential amplifier 75. Differential amplifier 75 differentiates between both signals, providing an output differential signal comprising information relating to changes in reflectivity of surface 55. Differential signal is then fed into an amplifier stage 77, which amplifies the differential signal 75. This amplified differential signal is then fed to a lamp control system 79. Lamp control system 79, having the amplified differential signal as an input, systematically controls of the output level of lamp arrays 64 and 66. This can be accomplished a variety of ways known to one of ordinary skill in the art, such as a microcomputer for example. By employing this feedback control scheme, such as PID for example, the output level of lamp arrays 64 and 66 can be calibrated so as to provide a more uniform ramp up, steady state or ramp down cycle.

Figure 10:
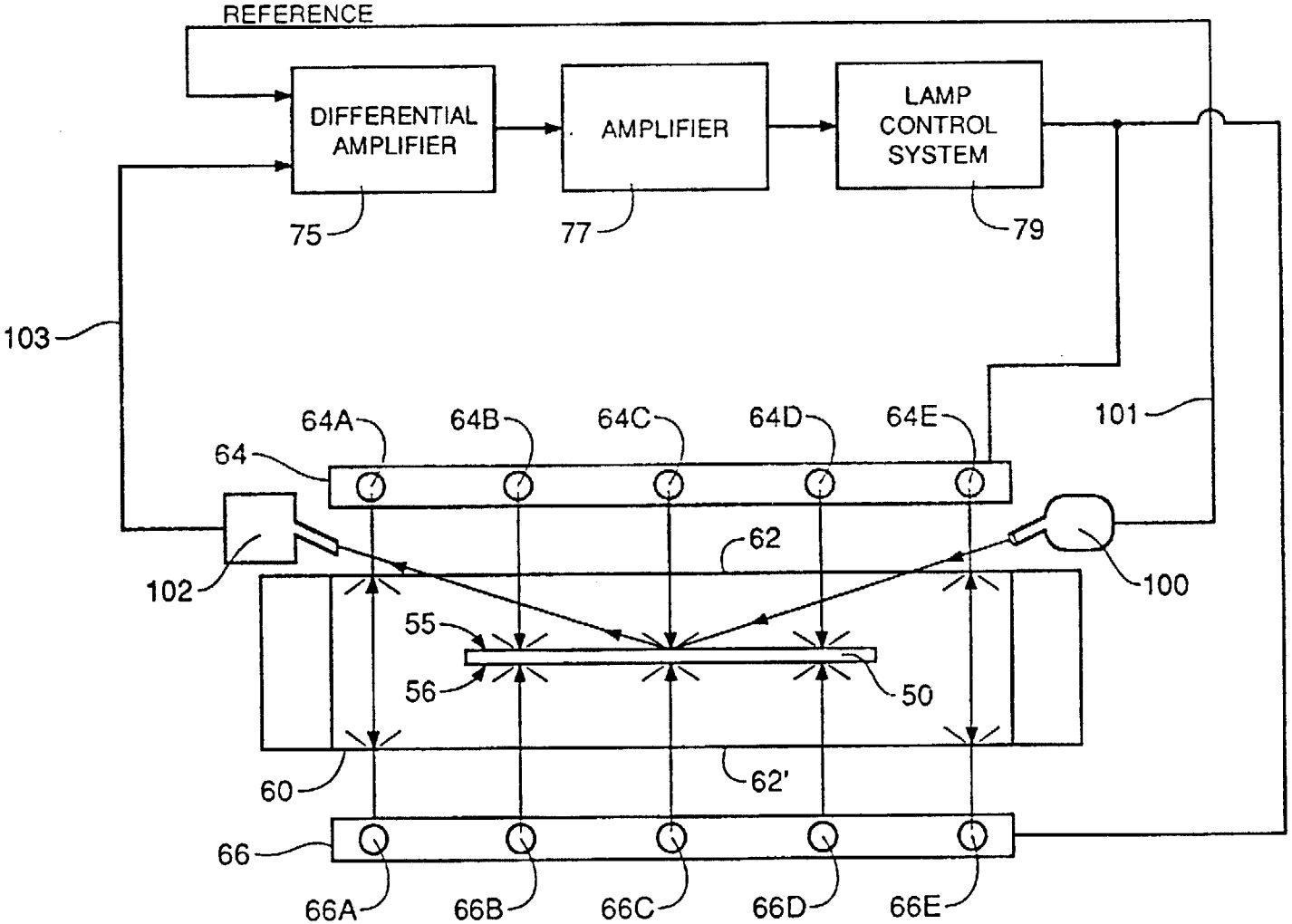
FIG. 10 is a fourth alternate embodiment of present inventive system configuration.

It should be obvious to one of ordinary skill in the art that the lamp array (64 and 66) configuration of FIG. 10 is applicable to the system configurations of FIGS. 6 through 9. In that same light, the singular lamp array configuration can also be employed in any of the hereinabove embodiments.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. For example, while in several embodiments of the present invention, a pair of light sensors have been employed to sense changes in a surface's reflectivity. However, it should be obvious to one of ordinary skill in the art that one light sensor can sense the initial reflectivity as well as the reflectivity continuously during the process of forming a layer. It is therefore contemplated that the appended claims will cover any such modifications or embodiments as fall within the true scope of the invention.

What is claimed is:

1. A method for measuring the temperature of a substrate comprising the steps of:

providing a su in a chamber, said substrate, having a reflective surface;

exposing said substrate to a gas and radiant energy to form a film superjacent said substrate, said energy having a power level;

comparing the reflectivity of said surface prior to said exposing and while said film is being formed, said power level responsive to differences in said compared reflectivity.

2. A method for measuring the temperature of a substrate according to claim 1, wherein said method is performed in situ under substantially high vacuum.

3. A method for measuring the temperature of a substrate, according to claim 1, wherein said surface comprises a layer formed superjacent said substrate.

4. A method for measuring the temperature of a substrate, according to claim 3, wherein said layer comprises a masking pattern.

5. A method for measuring the temperature of a substrate, according to claim 3, wherein said layer is formed by at least one of Chemical Vapor Deposition ("CVD"), Rapid Thermal Processing Chemical Vapor Deposition ("RTPCVD"), Low Pressure Chemical Vapor Deposition ("LPCVD"), Molecular Beam Epitaxy ("MBE"), Reactive Ion Sputtering ("RIS"), Physical Vapor Deposition ("PVD") and Plasma Processing.

6. A method for measuring the temperature of a substrate, according to claim 5, wherein said layer functions as a barrier layer, said layer comprising at least one of TiN and TaN.

7. A method for measuring the temperature of a substrate, according to claim 1, wherein the reflectivity of said surface prior to said exposing is continuously compared with the reflectivity of said surface during said exposing until said film is substantially formed.

8. A method for measuring the temperature of a substrate, according to claim 1, wherein said substrate comprises at least one of single crystal silicon, polycrystalline silicon, and amorphous silicon.

9. A method for measuring the temperature of a substrate, according to claim 8, wherein said energy compresses photon energy substantially in the absorption band of said substrate.

10. A method for measuring the temperature of a substrate, according to claim 9, wherein said photon energy comprises a wavelength range substantially between substantially low ultraviolet to substantially high infrared.

11. A method for measuring the temperature of a substrate, according to claim 10, wherein said range is substantially between 0.2 μm and 2.2 μm.

12. A method for continuously measuring the temperature of a semiconductor substrate, comprising the steps of:

providing a substrate in a chamber, said substrate comprising a layer, said layer having a reflective surface;

forming a film superjacent said surface;

comparing the reflectivity of said surface prior to forming said film and while said film is forming; and exposing said surface to radiant energy, said energy having a power level, said power level responsive to said compared reflectivities.

13. A method for continuously measuring the temperature of a semiconductor substrate, according to claim 12, wherein said forming a film comprises the step of:

exposing said substrate to a first gas and said radiant energy in situ.

14. A method for continuously measuring the temperature of a semiconductor substrate according to claim 13, wherein said first gas comprises at least one of $N_2$, $NH_3$, $O_2$, $N_2O$, Ar, Ar—$H_2$, $H_2$, $GeH_4$, and a Fluorine based gas.

15. A method for continuously measuring the temperature of a semiconductor substrate, according to claim 14, wherein said radiant energy generates heat substantially within the range of 500° C. to 1250° C.

16. A method for continuously measuring the temperature of a semiconductor substrate, according to claim 15, wherein said substrate is exposed to said first gas for approximately 5 seconds to 60 seconds at a flow rate substantially in the range of 50 sccm to 20,000 sccm.

17. A method for continuously measuring the temperature of a semiconductor substrate, according to claim 12, wherein the reflectivity of said surface prior to said forming is continuously compared with the reflectivity of said surface during said forming until said film is substantially formed.

18. A method for continuously measuring the temperature of a substrate, according to claim 16, further comprising the step of:

substantially cleaning said substrate prior to said forming.

19. A method for continuously measuring the temperature of a semiconductor substrate, according to claim 18, wherein said cleaning comprises introducing a second gas at a temperature substantially within the range of 500° C. to 1250° C. for approximately 10 to 60 seconds, said second gas comprising at least one of: $CF_4$; $C_2F_2$; $C_2F_6$; $C_4F_8$; $CHF_3$; HF; $NF_3$; $NF_3$ diluted with ar—$H_2$; and $GeH_4$, HF, and $H_2$ diluted with Ar—$H_2$.

20. A method for externally measuring the continuous temperature of a semiconductor substrate in chamber, comprising the steps of:

providing a substantially clean semiconductor substrate in said chamber, said substrate having a layer superjacent said substrate, said layer having a reflective surface;

forming a film superjacent said surface by introducing a gas and photon energy in situ, said gas comprising at least one of $N_2$, $NH_3$, $O_2$ and $N_2O$, said energy generating a temperature substantially within the range of 500° C. to 1250° C., said energy substantially in the absorption band of silicon;

measuring the reflectivity of said surface prior to said forming and continuously during said forming until said film is substantially formed; and exposing said substrate to said photon energy, said energy having a power level, said power level responsive to the measured reflectivities of said film.

*21. A method for measuring the temperature of a substrate, comprising:*

*providing a substrate in a chamber, said substrate having a reflective surface;*

*exposing said substrate to a gas and radiant energy to form a film over said substrate, said energy having a power level;*

*controlling said power level responsive to comparing the reflectivity of said surface prior to said exposing to the reflectivity of said surface while said film is being formed.*

*22. A method for measuring the temperature of a substrate according to claim 21, wherein said method is performed under substantially high vacuum.*

*23. A method for measuring the temperature of a substrate, according to claim 21, wherein said surface comprises a layer formed over said substrate.*

*24. A method for measuring the temperature of a substrate, according to claim 23, wherein said layer comprises a masking pattern.*

*25. A method for measuring the temperature of a substrate, according to claim 23, wherein said layer is formed by at least one of Chemical Vapor Deposition ("CVD"), Rapid Thermal Processing Chemical Vapor Deposition ("RTPCVD"), Low Pressure Chemical Vapor Deposition ("LPCVD"), Molecular Beam Epitaxy ("MBE"), Reactive Ion Sputtering ("RIS"), Physical Vapor Deposition ("PVC") and Plasma Processing.*

*26. A method for measuring the temperature of a substrate, according to claim 23, wherein said layer functions as a barrier layer, said layer comprising at least one of TiN and TaN.*

*27. A method for measuring the temperature of a substrate, according to claim 21, wherein the reflectivity of*

*said surface prior to said exposing is substantially continuously compared with the reflectivity of said surface during said exposing until said film is substantially formed.*

*28. A method for measuring the temperature of a substrate, according to claim 21, wherein said substrate comprising at least one of single crystal silicon, polycrystalline silicon and amorphous silicon.*

*29. A method for measuring the temperature of a substrate, according to claim 21, wherein said energy comprises photon energy substantially in the absorption band of said substrate.*

*30. A method for measuring the temperature of a substrate, according to claim 29, wherein said photon energy comprises a wavelength range substantially between substantially low ultraviolet to substantially high infrared.*

*31. A method for measuring the temperature of a substrate, according to claim 30, wherein said range is substantially between 0.2 μm and 2.2 μm.*

*32. A method for measuring the temperature of a semiconductor substrate, comprising:*

*providing a substrate in a chamber, said substrate comprising a layer, said layer having a reflective surface;*

*exposing said reflective surface to radiant energy, said energy having a power level;*

*forming a film over said reflective surface; and*

*controlling said power level responsive to comparing the reflectivity of said reflective surface prior to forming said film and while said film is forming.*

*33. A method for measuring the temperature of a semiconductor substrate, according to claim 32, wherein said forming a film further comprises exposing said substrate to a first gas and said radiant energy.*

*34. A method for measuring the temperature of a semiconductor substrate, according to claim 33, wherein said first gas comprises at least one of $N_2$, $NH_3$, $O_2$, $N_2O$, Ar, Ar—$H_2$, $H_2$, $GeH_4$, and a Fluorine based gas.*

*35. A method for measuring the temperature of a semiconductor substrate, according to claim 32, wherein said radiant energy generates heat substantially within the range of 500° C. to 1250° C.*

*36. A method for measuring the temperature of a semiconductor substrate, according to claim 35, wherein said substrate is exposed to said first gas for approximately 5 seconds to 60 seconds at a flow rate substantially in the range of 50 sccm to 20,000 sccm.*

*37. A method for measuring the temperature of a semiconductor substrate, according to claim 32, wherein the reflectivity of said surface prior to said forming is continuously compared with the reflectivity of said surface during said forming until said film is substantially formed.*

*38. A method for measuring the temperature of a substrate, according to claim 32, further comprising substantially cleaning said substrate prior to said forming.*

*39. A method for continuously measuring the temperature of a semiconductor substrate, according to claim 38, wherein said cleaning comprises introducing a second gas at a temperature substantially within the range of 500° C. to 1250° C. for approximately 10 to 60 seconds, said second gas comprising at least one of: $CF_4$; $C_2F_2$; $C_2F_6$; $C_2F_8$; $CHF_3$; HF; $NF_3$; $NF_3$ diluted with Ar—$H_2$; and $GeH_4$, HF, and $H_2$ diluted with Ar—$H_2$.*

*40. A method for externally measuring the continuous temperature of a semiconductor substrate in a chamber, comprising:*

*providing a substantially clean semiconductor substrate having a layer over said substrate, said layer having a reflective surface;*

*forming a film over said layer by exposing said layer to a gas and photon energy, said gas comprising at least one of $N_2$, $NH_3$, $O_2$ and $N_2O$, said energy generating a temperature substantially within the range of 500° C. to 1250° C., said energy substantially in the absorption band of silicon;*

*measuring the reflectivity of said surface prior to said forming and continuously during said forming until said film is substantially formed; and*

*controlling a power level of said photon energy responsive to said measured reflectivities.*

*41. A method for controlling the temperature of a semiconductor substrate having a reflective surface comprising:*

*exposing the reflective surface to radiant energy, said energy having a power level;*

*sensing changes in reflectivity of the reflective surface while a layer is formed on the reflective surface; and*

*controlling said power level in response to said sensed changes in reflectivity.*

*42. The method of claim 41, wherein said method is performed under substantially high vacuum.*

*43. The method of claim 41, wherein the reflectivity of said surface prior to said exposing is substantially continuously compared with the reflectivity of said surface during said exposing until said layer is substantially formed.*

*44. The method of claim 41, wherein said substrate comprises at least one of single crystal silicon, polycrystalline silicon, and amorphous silicon.*

*45. The method of claim 41, wherein said energy comprises photon energy substantially in the absorption band of said substrate.*

*46. The method of claim 45, wherein said photon energy comprises a wavelength range substantially between substantially low ultraviolet to substantially high infrared.*

*47. The method of claim 30, wherein said range is substantially between 0.2 μm and 2.2 μm.*

*48. A method for controlling the temperature of a semiconductor substrate, comprising:*

*providing a semiconductor substrate having a reflective surface;*

*forming a film on said reflective surface by introducing a first gas and photon energy;*

*measuring the reflectivity of said reflective surface prior to said forming and during said forming until said film is substantially formed; and*

*controlling a power level of said photon energy in response to said measured reflectivity.*

*49. The method of claim 48, wherein said first gas comprises at least one of $N_2$, $NH_3$, $O_2$, $N_2O$, Ar, Ar—$H_2$, $H_2$, $GeH_4$, and a Fluorine based gas.*

*50. The method of claim 48, wherein said radiant energy generates heat substantially within the range of 500° C. to 1250° C.*

*51. The method of claim 48, wherein said substrate is exposed to said first as for approximately 5 seconds to 60 seconds at a flow rate substantially in the range of 50 sccm to 20,000 sccm.*

*52. The method of claim 48, wherein the reflectivity of said surface prior to said forming is continuously compared with the reflectivity of said surface during said forming until said film is substantially formed.*

*53. The method of claim 48, further including substantially cleaning said substrate prior to said forming.*

*54. The method of claim 49, wherein said cleaning comprises introducing a second gas at a temperature substantially within the range of 500° C. to 1250° C. for approximately 10 to 60 seconds, said second gas comprising at least one of: $CF_4$; $C_2F_2$; $C_2F_6$; $C_4F_8$; $CHF_3$; HF; $NF_3$; $NH_3$ diluted with Ar—H2; and $GeH_4$, HF, and $H_2$ diluted with Ar—$H_2$.*

*55. A method for controlling the temperature of a semiconductor substrate having a reflective surface, comprising:*

*forming a film over said surface;*

*exposing said reflective surface to radiant energy, said energy having a power level;*

*measuring the reflectivity of said reflective surface prior to forming said film and while said film is forming; and*

*controlling said power level in response to said measured reflectivities.*

*56. The method of claim 55, wherein said forming a film further comprises exposing said substrate to a first gas and said radiant energy.*

*57. The method of claim 56 wherein said first gas comprises at least one of $N_2$, $NH_3$, $O_2$, $N_2O$, Ar, Ar—$H_2$; $H_2$; $GeH_4$, and a Fluorine based gas.*

*58. The method of claim 55, wherein said radiant energy generates heat substantially within the range of 500° C. to 1250° C.*

*59. The method of claim 56, wherein said substrate is exposed to said first gas for approximately 5 seconds to 60 seconds at a flow rate substantially in the range of 50 sccm to 20,000 sccm.*

*60. The method of claim 55, wherein the reflectivity of said surface prior to said forming is continuously compared with the reflectivity of said surface during said forming until said film is substantially formed.*

*61. The method of claim 55, further comprising substantially cleaning said substrate prior to said forming.*

*62. The method of claim 61, wherein said cleaning comprises introducing a second gas at a temperature substantially within the range of 500° C. to 1250° C. for approximately 10 to 60 seconds said second gas comprising at least one of: $CF_4$; $C_2F_2$; $C_2F_6$; $C_4F_8$; $CHF_3$; HF; $NF_3$; $NF_3$ diluted with Ar—H2; and $GeH_4$, HF, and $H_2$ diluted with Ar—$H_2$.*

* * * * *